United States Patent
Hsieh

(10) Patent No.: US 7,800,707 B2
(45) Date of Patent: Sep. 21, 2010

(54) BACKLIGHT MODULE AND LIQUID CRYSTAL DISPLAY DEVICE USING SAME

(75) Inventor: Hsiang-Hui Hsieh, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 496 days.

(21) Appl. No.: 11/891,805

(22) Filed: Aug. 13, 2007

(65) Prior Publication Data

US 2008/0036942 A1 Feb. 14, 2008

(30) Foreign Application Priority Data

Aug. 11, 2006 (TW) .................................. 95129558

(51) Int. Cl.
G02F 1/13357 (2006.01)
F21V 7/04 (2006.01)

(52) U.S. Cl. ........................ 349/58; 349/65; 362/613; 362/633

(58) Field of Classification Search .................... 349/58, 349/65; 362/97.2, 249.02, 561, 612, 631, 362/632, 633, 634

See application file for complete search history.

(56) References Cited

U.S. PATENT DOCUMENTS

| 6,880,953 | B2 | 4/2005 | Shin | |
|---|---|---|---|---|
| 6,935,764 | B2 | 8/2005 | Choi et al. | |
| 2006/0114689 | A1* | 6/2006 | Chang et al. | 362/561 |
| 2006/0146577 | A1* | 7/2006 | Hsieh et al. | 362/633 |
| 2007/0115691 | A1* | 5/2007 | Yu | 362/632 |

FOREIGN PATENT DOCUMENTS

| CN | 2564311 Y | 8/2003 |
|---|---|---|
| CN | 1786788 A | 6/2006 |

* cited by examiner

*Primary Examiner*—Dung T Nguyen
*Assistant Examiner*—Tai Duong
(74) *Attorney, Agent, or Firm*—Wei Te Chung

(57) ABSTRACT

A backlight module (200) includes a fame (55) having a plurality of side walls (551, 552, 553, 554); a light guide plate (53) received in the frame, having a light incident surface (533); at least one spring element (5523), having a spring finger (5525) and a connecting arm (5524) connecting the spring finger and one side wall of the frame; and at least one radiation element (56) disposed between the spring finger and the light incident surface. The width of the at least one radiation element is larger than a distance between the light incident surface and the spring finger in a free state.

19 Claims, 8 Drawing Sheets

BACKLIGHT MODULE AND LIQUID CRYSTAL DISPLAY DEVICE USING SAME

CROSS-REFERENCE TO RELATED APPLICATION

This application is related to, and claims the benefit of, a foreign priority application filed in Taiwan as Serial No. 095129558 on Aug. 11, 2006. The related application is incorporated herein by reference.

FIELD OF THE INVENTION

The present invention relates to a backlight module and a liquid crystal display (LCD) device using the same, and more particularly to a backlight module with a spring finger.

GENERAL BACKGROUND

Liquid crystal displays are commonly used as display devices for compact electronic apparatuses, because they not only are very thin but also provide good quality images with little power consumption. The liquid crystals in a liquid crystal display do not emit any light themselves. The liquid crystals have to be lit by a light source so as to clearly and sharply display text and images. Thus, a backlight module for an LCD is generally needed.

FIG. 11 shows a schematic, top view of a conventional LCD 100. The LCD 100 includes a flexible printed circuit board (FPC) 110, a liquid crystal display panel 120, a plastic frame 130, two light emitting diodes (LEDs) 140 cooperatively serving as a light source, and a light guide plate 150.

The FPC 110 connects with the liquid crystal display panel 120, and includes a main circuit area 111 and a light source setting area 112. The light source setting area 112 extends from the main circuit area 111. The LEDs 140 are arranged on the light source setting area 112 of the FPC 110. The frame 130 includes a depressed portion 131, and the depressed portion 131 has two openings 132.

The LCD 100 can be assembled according to the following sequence: firstly, setting the light guide plate 150 inside the frame 130; secondly, putting the light source setting area 112 into the depressed portion 131, and placing the LEDs 140 into the openings 132; thirdly, attaching the main circuit area 111 to the frame 130 and the light guide plate 150; and finally, attaching the liquid crystal display panel 120 to the frame 130.

However, the above-mentioned conventional liquid crystal display has the following problems.

The sizes of the openings 132 may not accurately match the sizes of the LEDs 140, due to imprecise manufacturing. When this happens, small gaps exist between the LEDs 140 and the light guide plate 150 after assembly. These gaps may diminish the emitting luminance of the light guide plate 150.

FIG. 12 is a graph showing the negative impact of the above mentioned gaps on the effective utilization of the emitting luminance. X represents the distance between the LEDs 140 and a light incident surface (not labeled) of the light guide plate 150 in millimeters (mm), and Y represents the relative emitting luminance of the light guide plate 150 as a function of X. It can be seen that the greater the value of X, the lower the value of Y. That is, the greater the gap, the lower the value of the relative emitting luminance.

What is needed, therefore, is a backlight module and a liquid crystal display device using the same that overcome the above-described deficiencies.

SUMMARY

In a preferred embodiment, a backlight module includes a fame having a plurality of side walls; a light guide plate received in the frame, having a light incident surface; at least one spring element, having a spring finger and a connecting arm connecting the spring finger and one side wall of the frame; and at least one radiation element disposed between the spring finger and the light incident surface. The width of the at least one radiation element is larger than, a distance between the light incident surface and the spring finger in a free state.

In another preferred embodiment, a liquid crystal display device a liquid crystal display panel; and a backlight module disposed adjacent to the liquid crystal display panel. The backlight module has a fame having a plurality of side walls; a light guide plate received in the frame, having a light incident surface; at least one spring element, having a spring finger and a connecting arm connecting the spring finger and one side wall of the frame; and at least one radiation element disposed between the spring finger and the light incident surface. The width of the at least one radiation element is larger than a distance between the light incident surface and the spring finger in a free state.

In a further another preferred embodiment, a backlight module includes a light guide plate, at least one spring element, and at least one radiation element. The light guide plate has a main body and at least one protruding frame, the main body having a light incident surface, the at least one protruding frame extending from the light incident surface. The at least one spring element has a spring finger and a connecting arm connecting the spring finger and a side wall of the protruding frame, facing the light incident surface. The at least one radiation element is disposed between the spring finger and the light incident surface. The width of the at least one radiation element is larger than a distance between the light incident surface and the spring finger in a free state.

Other advantages and novel features will become more apparent from the following detailed description when taken in conjunction with the accompanying drawings.

DETAILED DESCRIPTION OF PREFERRED EMBODIMENTS

Reference will now be made to the drawings to describe the preferred embodiments in detail.

Figure 1:
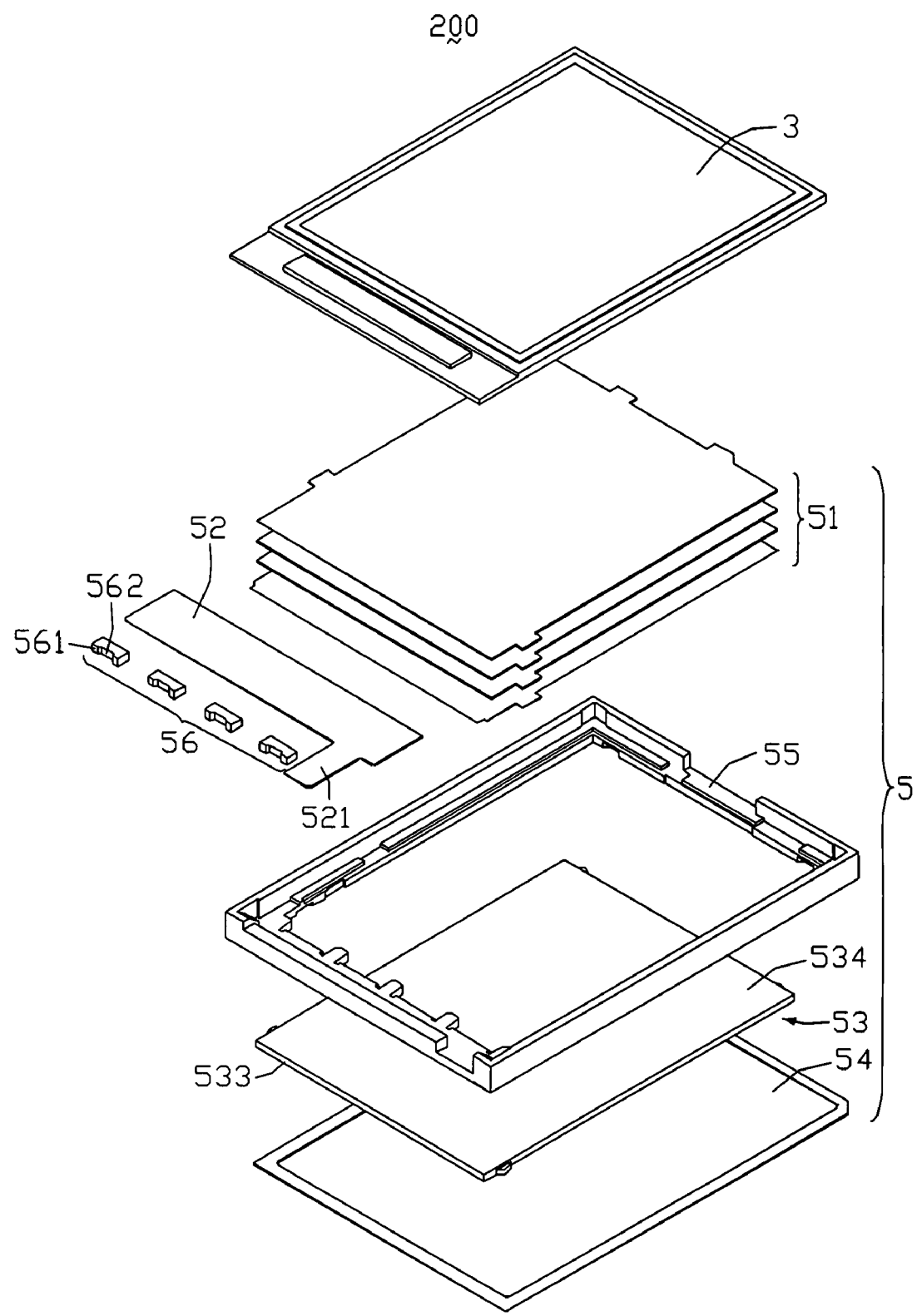
FIG. 1 is an exploded, isometric view of an LCD device according to a preferred embodiment of the present invention, the LCD device including a printed circuit board, a frame, a light guide plate, a reflective plate, a bottom tray, and LEDs.

FIG. 1 is an exploded, isometric view of an LCD device according to a preferred embodiment of the present invention. The LCD device 200 includes a liquid crystal display panel 3, and a backlight module 5.

The backlight module 5 includes a plurality of optical films 51, a frame 55, a light guide plate 53, and a reflective plate 54 arranged from top to bottom in that order. The backlight module 5 further includes a plurality of radiation elements 56, and a printed circuit board 52.

The light guide plate 53 includes a light incident surface 533, and a light emitting surface 534 adjoining the light incident surface 533. The optical films are provided on the light emitting surface 534, the reflective plate 54 is provided at a bottom surface (not labeled) thereof. The plurality of radiation elements 56 fixed on the printed circuit board 52 is disposed between the frame 55 and the light guide plate 53, facing the light incident surface 533 of the light guide plate 53.

Figure 2:
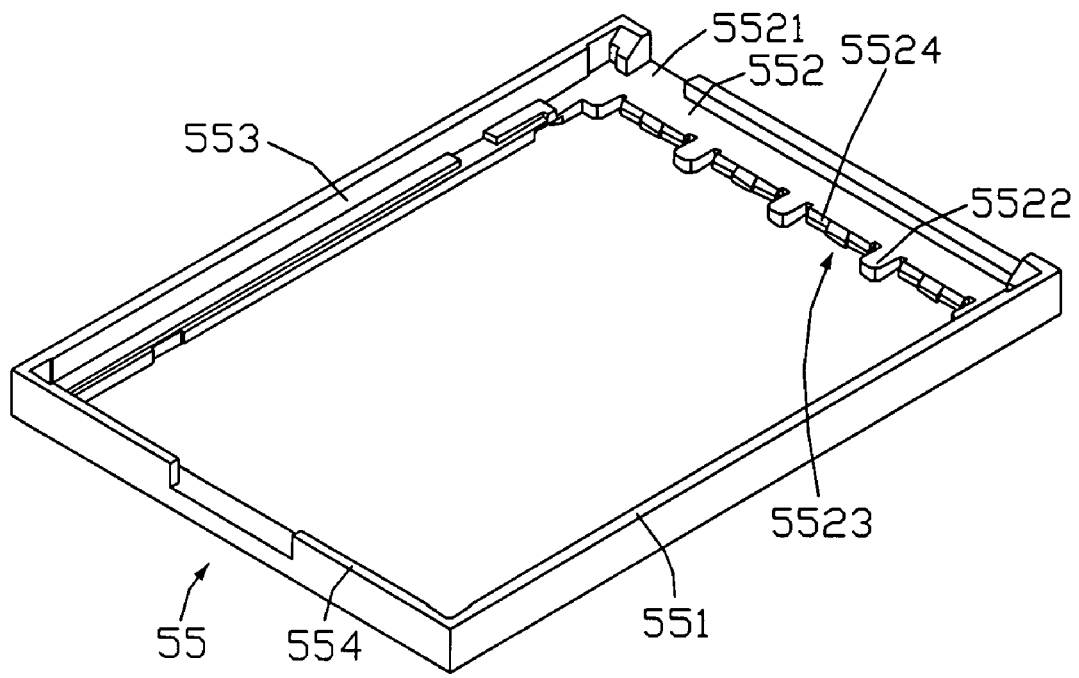
FIG. 2 is an isometric view of the frame of FIG. 1, shown from top side.
Figure 3:
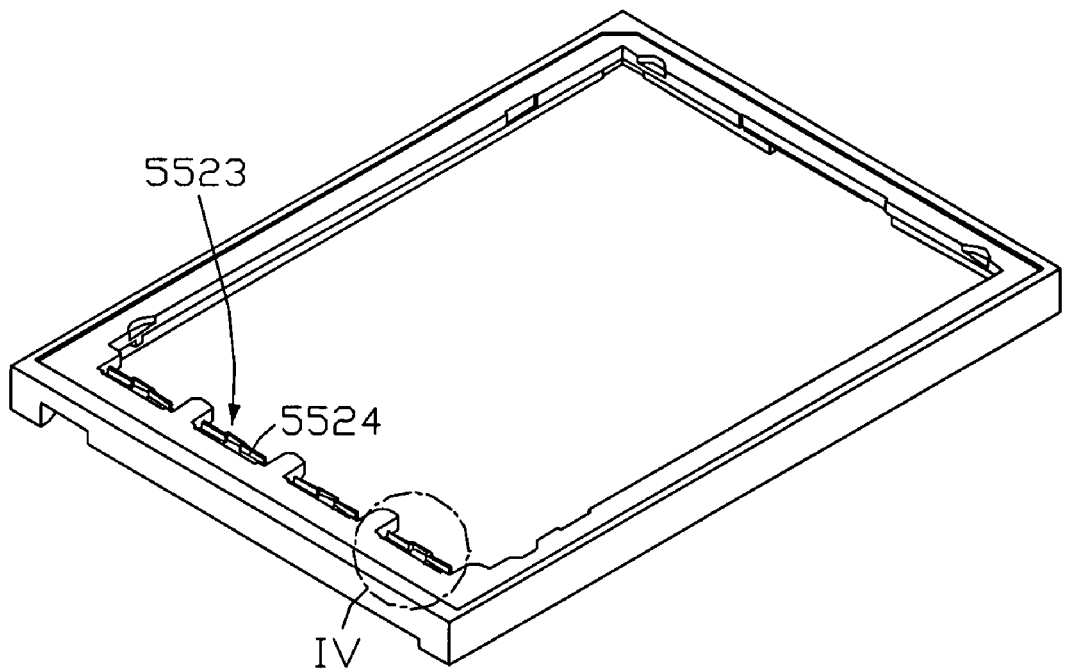
FIG. 3 is an isometric view of the frame of FIG. 1, shown from bottom side.

The printed circuit board 52 includes a connection strip 521 extending from a main body (not labeled) thereof. The radiation elements 56 are attached on the printed circuit board 52, and cooperatively serve as a light source. The radiation elements 56 are typically light emitting diodes (LEDs). Typically, the printed circuit board 52 is a flexible printed circuit. Each radiation element 56 has a side surface 561 having a groove 562 formed thereon, Referring to FIG. 2 and FIG. 3, the frame 55 is shown from different viewing angles. The frame 55 is preferably made of plastic, which includes a first side wall 551, a second side wall 552, a third side wall 553, a fourth side wall 554. The first side wall 551, the second side wall 552, the third side wall 553, and the fourth side wall 554 cooperatively define a space (not labeled) therebetween.

Figure 4:
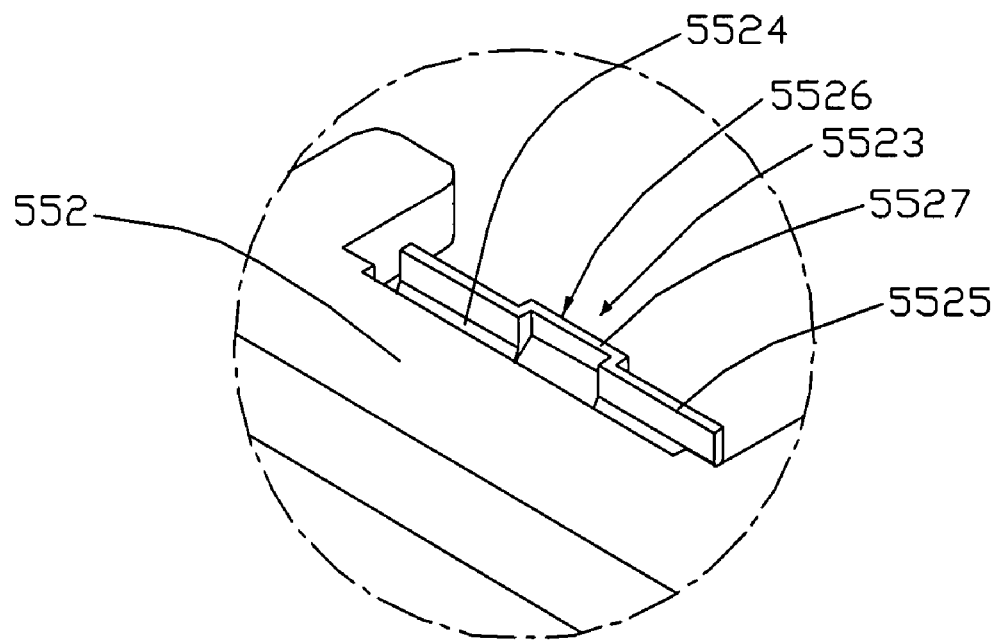
FIG. 4 is a partially enlarged view of a circled region IV of FIG. 3.

The second side wall 552 defines an opening 5521 at one end thereof. A plurality of partition arms 5522 and a plurality of spring elements 5523 are alternately formed along an inside surface of the frame 55 at the second side wall 552. The partition arms 5522 and the spring elements 5523 are disposed parallel to each other, and extend into the space. Two adjacent partition arms 5522 and one of the spring elements 5523 formed therebetween define a light source setting area (not labeled). The radiation elements 56 can be respectively disposed in a series of light source setting areas including areas between two adjacent partition arms 5522, corresponding to one spring element 5523. That is, the radiation elements 56 can be arranged to abut the partition arms 5522 respectively. Each spring element 5523 protrudes toward the fourth side wall 554. As shown in FIG. 4, each spring element 5523 includes a connecting arm 5524 and a spring finger 5525. The connecting arm 5524 is strip-shaped, having a predetermined thickness, and connecting the second side wall 552 and the spring finger 5525. The spring finger 5525 is parallel to the second side wall 552, spacing a predetermined interval with the second side wall 552. Each spring finger 5525 has a contacting surface 5526, corresponding to one of the radiation elements 56. A protrusion 5527 is provided at the contacting surface 5526, extending toward the fourth side wall 554. The protrusion 5527 corresponds to the groove 562 of one of the radiation elements 56. In assembly, a top surface of the protrusion 5527 can tightly mate with a bottom surface of the groove 562, i.e. the top surface of the protrusion 5527 can wholly adjoin the bottom surface of the groove 562. The spring element 5523 is made from the same material as the frame 55, being integrated on the frame 55.

Figure 5:
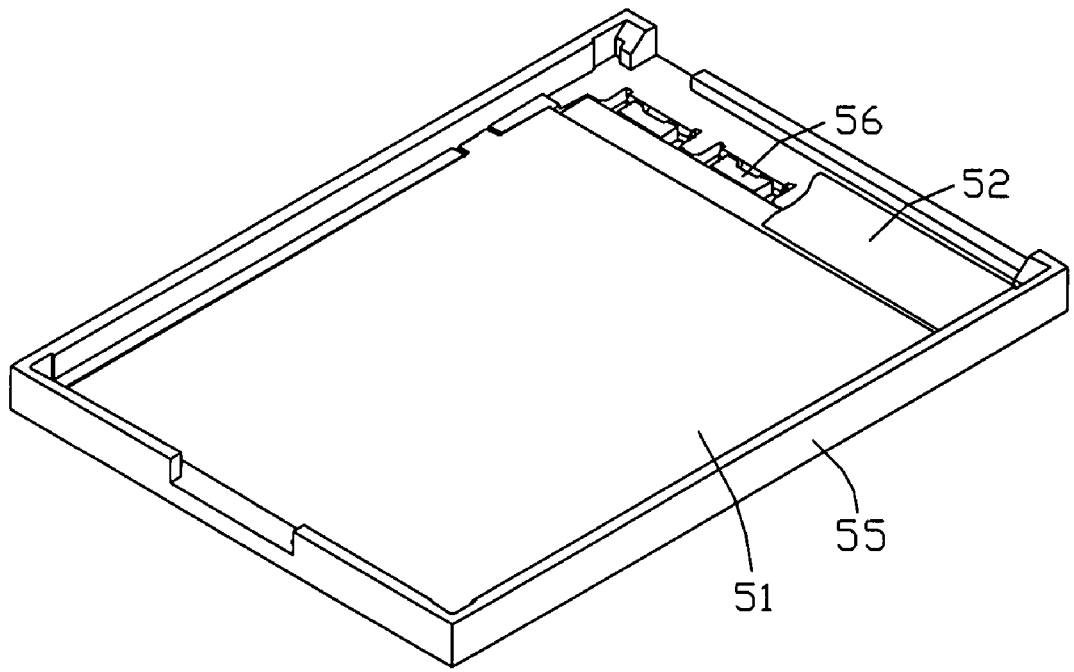
FIG. 5 is a top plan view of the printed circuit board, frame, light guide plate, reflective plate, bottom tray and LEDs of FIG. 1 assembled together, with the circuit board partially cut away to show two of the LEDs.

In assembly, referring to FIG. 5, the printed circuit board 52, frame 55, light guide plate 53, reflective plate 54, and radiation elements 56 of FIG. 1 are assembled together, with FIG. 5 showing the printed circuit board 52 partially cut away to show two of the radiation elements 56. The light guide plate 53 is received in the space of the frame 55. The reflective plate 54 is adhered to the bottom surface of the light guide plate 53. The plurality of optical films 51 is disposed on the light emitting surface 534 of the light guide plate 53. The printed circuit board 52 with the radiation elements 56 is received in the space adjacent to the second side wall 552, such that the printed circuit board 52 covers the arms 5522 and the spring element 5523. The radiation elements 56 are thus received in the series of light source setting areas including the areas between each two adjacent arms 5522, such that the radiation elements 56 abut the light incident surface 533 of the light guide plate 53. The protrusion 5527 of each spring element 5523 tightly mates in the groove of the corresponding radiation element 56. Thus, the side surface 561 of the radiation element 56 adjoins the contacting surface 5526 of the spring finger 5525. The spring finger 5525 of the spring element 5523 presses the radiation element 56 toward the incident surface 533 of light guide plate 53, so that the light incident surface 533 of the light guide plate 53 is held very close to or against the radiation elements 56. Thus, the printed circuit board 52 with the radiation elements 56 is also fixed in the frame 55. The connection strip 521 of the printed circuit board 52 extends out from the opening 5521 of the second side wall 552 of the frame 55. In addition, a liquid crystal panel 3 is provided on the backlight module 5 to form the liquid crystal display device 200.

As shown in FIG. 5, the liquid crystal display device 200 utilizes the spring element 5523 to realize a stable fixation of the radiation element 56. In the assembly process, the spring finger 5525 of the spring element 5523 presses the radiation element 56 toward the light incident surface 533 of the light guide plate 53, so that the light incident surface 533 of the light guide plate 53 is held very close to or against the radiation elements 56. Thereby, distances between the radiation elements 56 and the light incident surface 533 are decreased or even eliminated. This enables the LCD device 200 to provide improved brightness and uniformity of emitting luminance and prevents the light beams emitted from the radiation elements 56 from emitting rearward.

In addition, each connecting arm 5524 connecting with the frame 55 has a width same to the interval between two adjacent partition arms 5522, and has a predetermined thickness. Thus, the connecting portion between the connecting arm 5524 and the frame 55 has a larger area, and thus the connecting portion does not easily produce rupture therebetween. In addition, the spring finger 5525 of the spring element 5523 is parallel to the second side wall 552 of the frame 552. Thus, in the assembly process, the process of assembling the radiation elements 56 in the frame 552 just needs pressing the radiation elements 56 downward. And the spring finger 5525 is not easy to be broken off.

Figure 6:
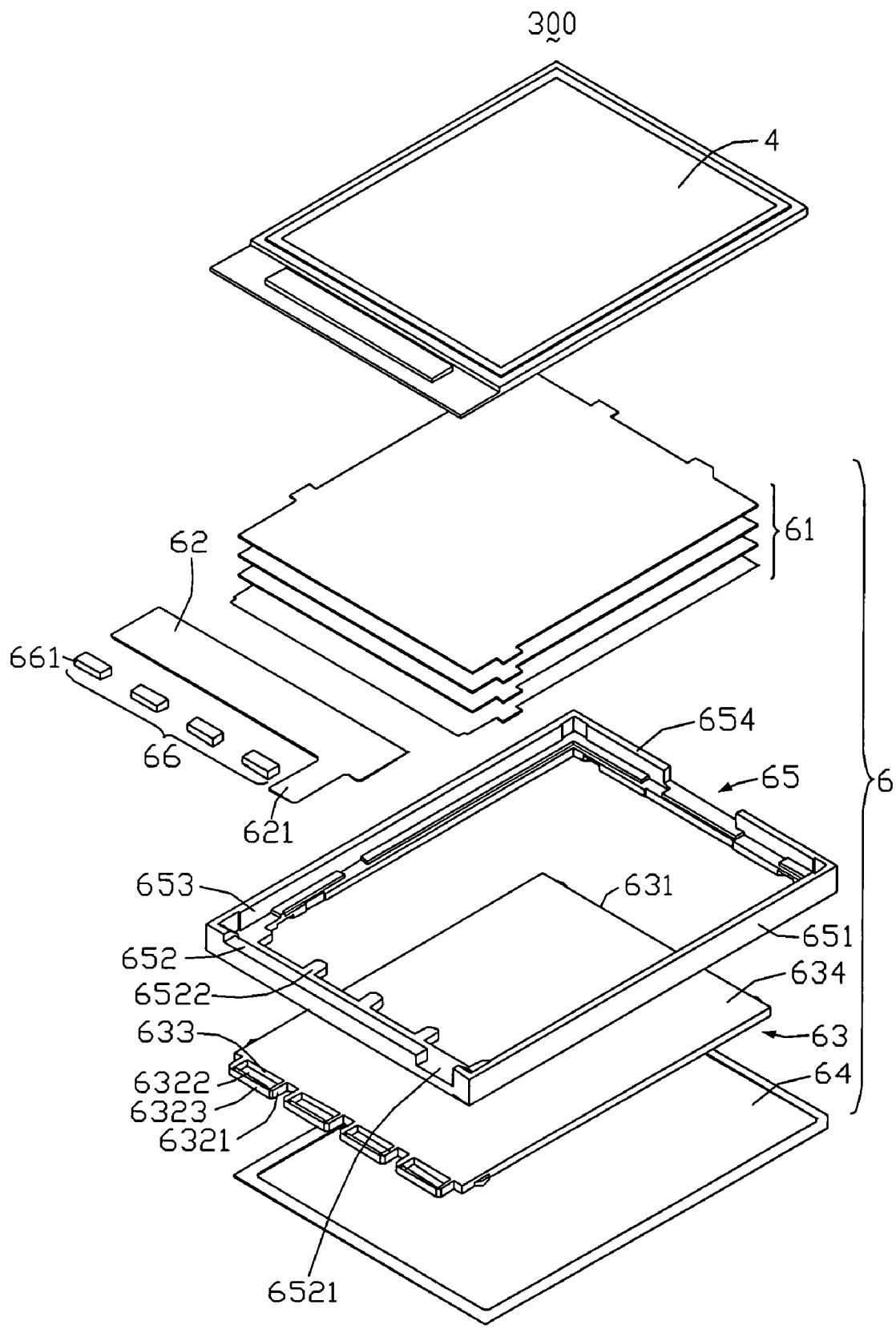
FIG. 6 is an exploded, isometric view of an LCD device according to a second preferred embodiment of the present invention, the LCD device including a printed circuit board, a frame, a light guide plate, a reflective plate, a bottom tray, and LEDs.

FIG. 6 is an exploded, isometric view of an LCD device according to a second preferred embodiment of the present invention. The LCD device 300 includes a liquid crystal display panel 4, and a backlight module 6.

The backlight module 6 includes a plurality of optical films 61, a frame 65, a light guide plate 63, and a reflective plate 64 arranged from top to bottom in that order. The backlight module 6 further includes a plurality of radiation elements 66, and a printed circuit board 62.

Figure 7:
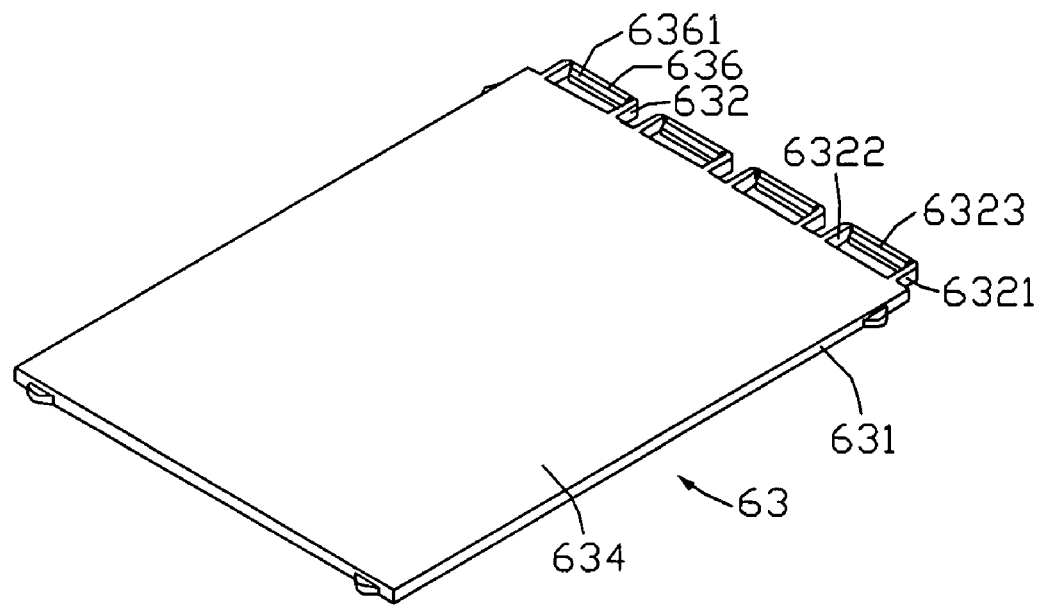
FIG. 7 is an isometric view of the light guide plate of FIG. 6. but viewed from another aspect.
Figure 8:
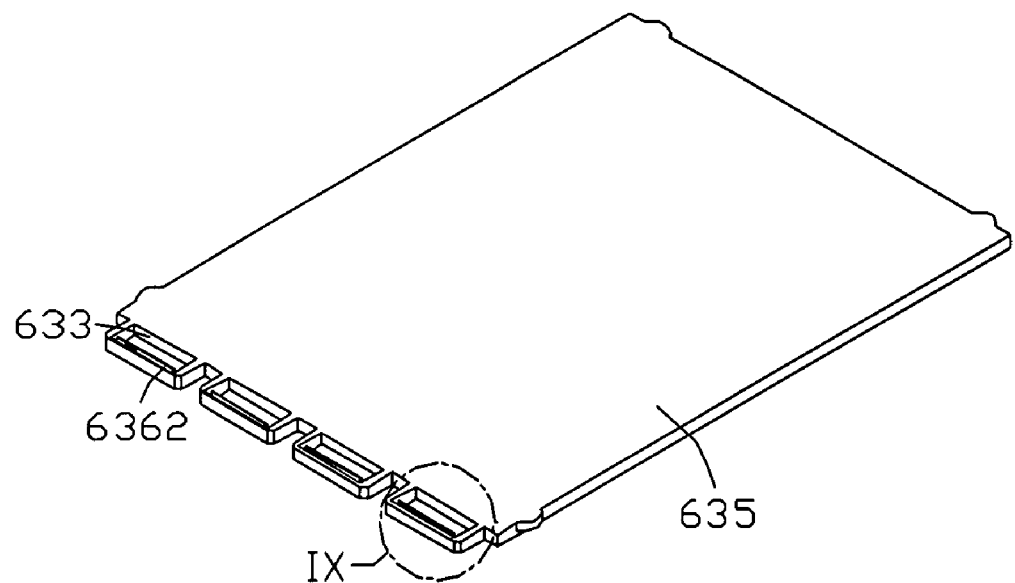
FIG. 8 is an isometric view of the light guide plate of FIG. 6, but showing the light guide plater inverted.
Figure 9:
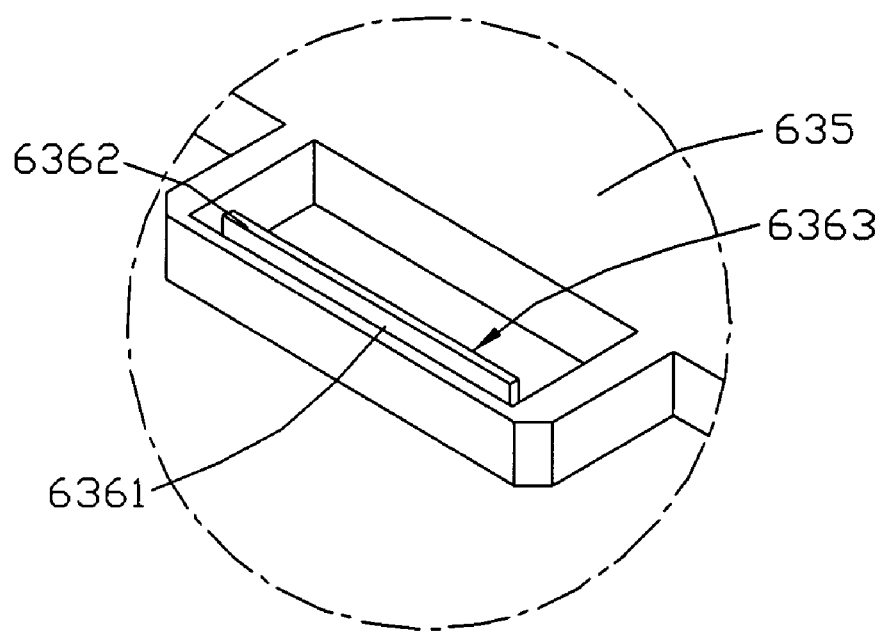
FIG. 9 is a partially enlarged view of a circled region IX of FIG. 8.
Figure 10:
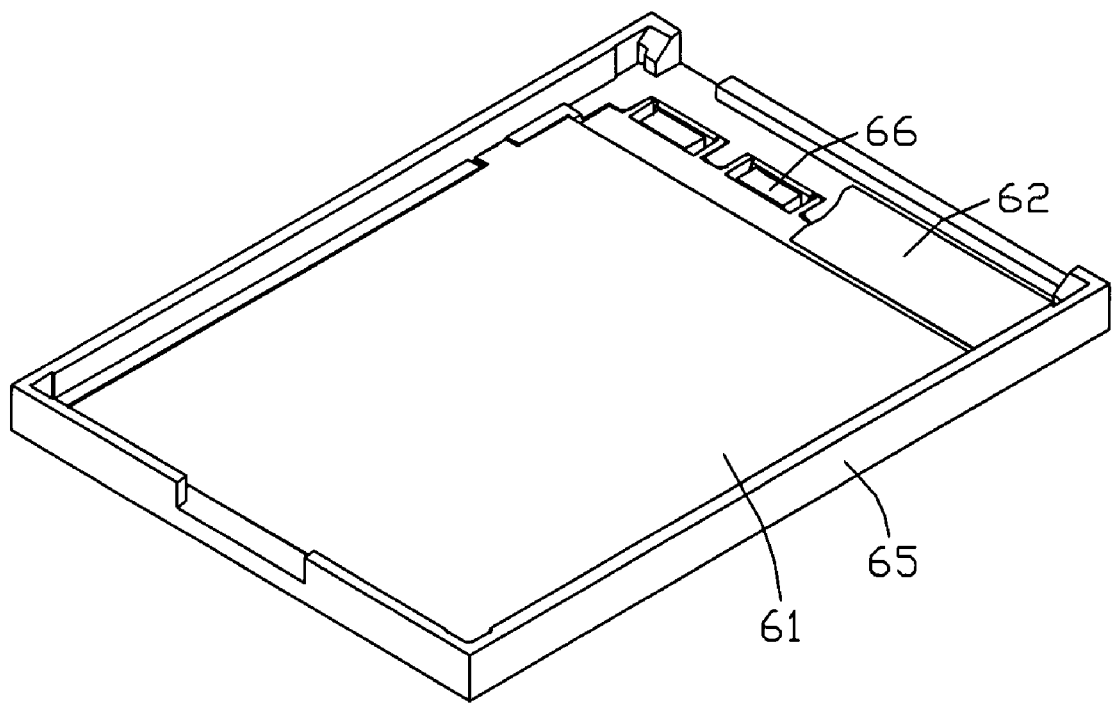
FIG. 10 is a top plan view of the printed circuit board, frame, light guide plate, reflective plate, bottom tray and LEDs of FIG. 5 assembled together, with the circuit board partially cut away to show two of the LEDs.
Figure 11:
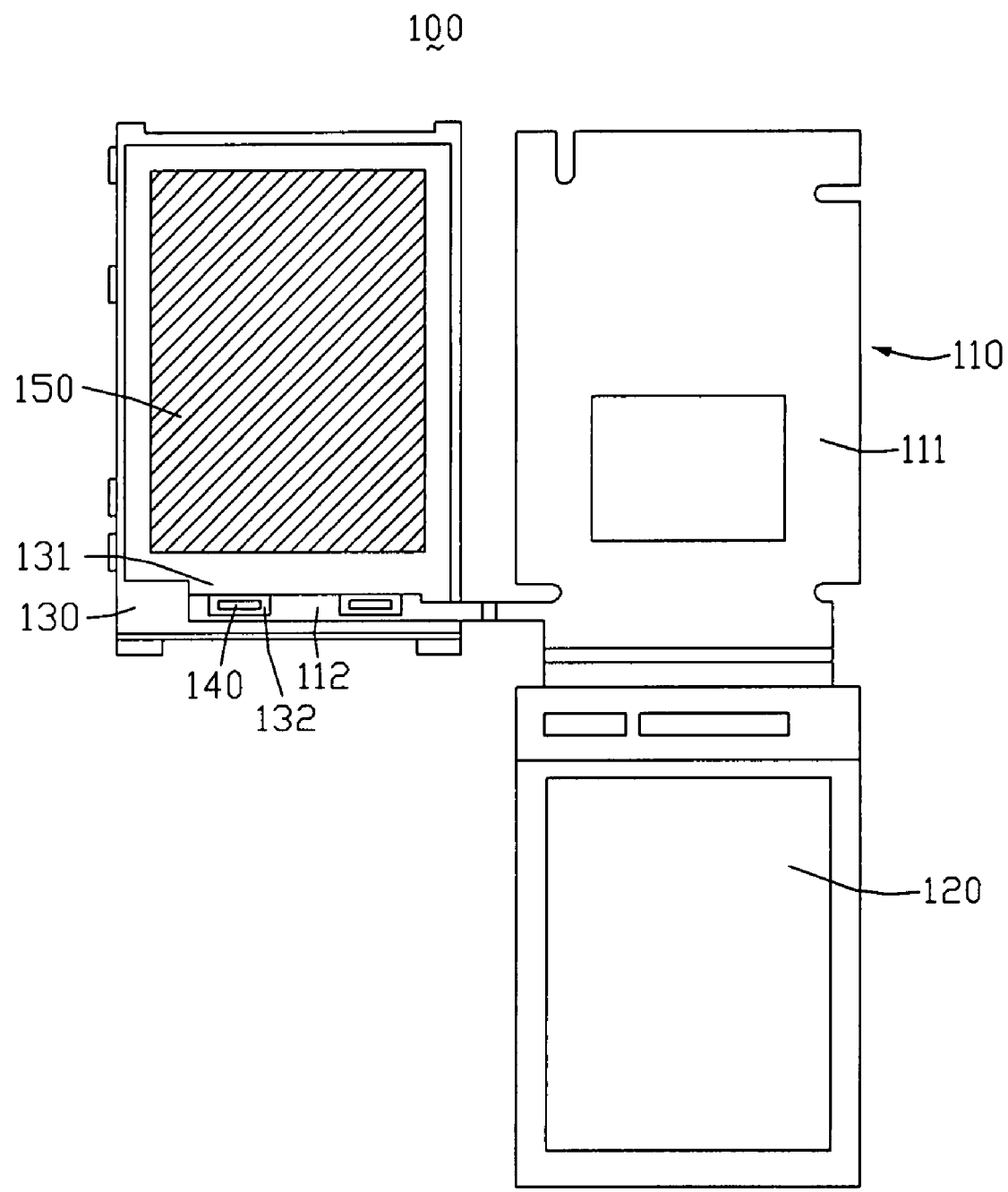
FIG. 11 is a schematic, top plan view of a conventional LCD device prior to assembly thereof, the LCD device including a light guide plate and two LEDs, the light guide plate having a light incident surface.
Figure 12:
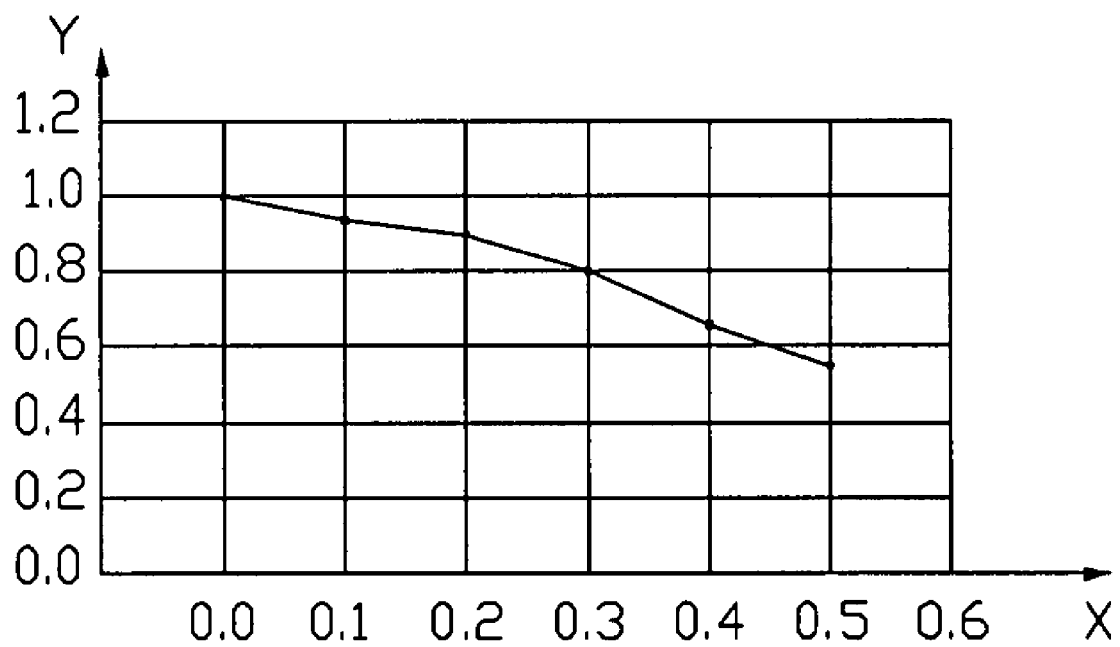
FIG. 12 is a graph showing relative emitting luminance ("Y") of the light guide plate of FIG. 6 varying as a function of a distance ("X") between the LEDs and the light incident surface of the light guide plate.

As shown in FIG. 7, FIG. 8 and FIG. 9, the light guide plate 63 includes a main body 631 and a plurality of protruding frames 632. The main body 631 has a light incident surface 633, a light emitting surface 634 adjoining the light incident surface 633, and a bottom surface 635 opposite to the light emitting surface 634. Each protruding frame 632 has a first side wall 6321, a second side wall 6322, a third side wall 6323 connecting the first and the second side walls 6321, 6322, and a spring element 636. The first and the second side walls 6321, 6322 vertically connect to the incident surface 633 of the main body 631, and have a thickness the same as that of the main body 631. Thus, the third side wall 6323 is parallel to the incident surface 633. The spring element 636 is disposed on the third side wall 6323, protruding toward the incident surface 633. The spring element 636 has a structure similar to that of the spring element 5523 of the first embodiment. The spring element 636 includes a connecting arm 6361 and a spring finger 6362. The connecting arm 6361 is strip-shaped, connecting the third side wall 6323 and the spring finger 6362. The spring finger 6362 is parallel to the third side wall 6323, spacing a predetermined interval with the third side wall 6323. Each spring finger 6362 has a contacting surface 6363. the contacting surface 6363 is smooth and flat. The spring element 636 is made from the same material of the light guide plate 63, being integrated on the light guide plate 63.

The printed circuit board 62 includes a connection strip 621 extending from a main body (not labeled) thereof. The radiation elements 66 are attached on the printed circuit board 62, and cooperatively serve as a light source. The radiation elements 66 are typically light emitting diodes (LEDs). Typically, the printed circuit board 62 is a flexible printed circuit. Each radiation element 66 has a side surface 661, and the side surface 661 is smooth and flat corresponding to the contacting surface 6363 of the spring finger 6362.

The frame 65 is preferably made of plastic. The frame 65 includes a first side wall 651, a second side wall 652, a third side wall 653, and a fourth side wall 654. The first side wall 651, the second side wall 652, the third side wall 653, and the fourth side wall 654 cooperatively define a space (not labeled) therebetween. The second side wall 652 defines an opening 6521 at one end thereof. A plurality of partition arms 6522 are formed along an inside surface of the frame 65 at the second side wall 652. The partition arms 6522 are disposed parallel to each other, and extend into the space. The plurality of protruding frames 632 can be respectively disposed in a series of spaces including spaces between two adjacent partition arms 6522.

In assembly, the light guide plate 63 is received in the space of the frame 65. The plurality of protruding frames 632 is adjacent to the second side wall 652, respectively disposed in a series of spaces including spaces between two adjacent partition arms 6522. The reflective plate 64 is adhered to the bottom surface 635 of the light guide plate 63. The plurality of optical films 61 is disposed on the light emitting surface 634 of the light guide plate 63. The printed circuit board 62 with the radiation elements 66 is received in the space adjacent to the second side wall 652, such that the printed circuit board 62 covers the arms 6522 and the radiation elements 66 are respectively received in the spaces defined by the plurality of protruding frames 632, such that the radiation elements 66 abut the incident surface 633 of the light guide plate 63. Thus, the side surface 661 of the radiation element 66 contacts with the contacting surface 6363 of the spring finger 6362. The spring finger 6362 of the spring element 633 presses the radiation element 66 toward the incident surface 633 of light guide plate 63, so that the light incident surface 633 of the light guide plate 63 is held very close to or against the radiation elements 66. Thus, the printed circuit board 62 with the radiation elements 66 is also fixed at the frame 65. The connection strip 621 of the printed circuit board 62 extends out from the opening 6521 of the second side wall 652 of the frame 65. In addition, a liquid crystal panel 4 is provided on the backlight module 6 to form the liquid crystal display device 300.

The liquid crystal display device 300 utilizes the spring element 636 to realize a stable fixation of the radiation element 66. In the assembly process, the spring finger 6362 of the spring element 636 presses the radiation element 66 toward the incident surface 633 of light guide plate 63, so that the light incident surface 633 of the light guide plate 63 is held very close to or against the radiation elements 66. Thereby, distances between the radiation elements 66 and the light incident surface 633 are decreased or even eliminated. This enables the LCD device 300 to provide improved brightness and uniformity of emitting luminance and prevents the light beams from the radiation element 66 from emitting rearward.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
   a frame having a plurality of side walls;
   a light guide plate received in the frame, and having a light incident surface;
   at least one elastic member integrally formed with the frame, the at least one elastic member comprising a contacting portion and a connecting portion configured for connecting the contacting portion with the side wall; and
   at least one radiation element disposed between the at least one elastic member and the light incident surface of the light guide plate and pressed by the at least one elastic member toward the light guide plate;
   wherein the contacting portion is opposite to the side wall and spaced a predetermined interval from the side wall, the contacting portion comprises two opposite end parts, and the at least one radiation element contacts the opposite end parts.

2. The backlight module as claimed in claim 1, wherein the connecting portion connects with a bottom side of the contacting portion.

3. The backlight module as claimed in claim 1, wherein the connecting portion directly connects with the opposite end parts.

4. The backlight module as claimed in claim 1, wherein the opposite end parts are substantially parallel to the side wall.

5. The backlight module as claimed in claim 1, wherein the contacting portion further comprises a middle part protruding toward the light guide plate, and the at least one radiation element defines a groove receiving the middle part of the contacting portion.

6. A backlight module, comprising:
a frame having a plurality of side walls;
a light guide plate received in the frame, and having a light incident surface;
at least one spring element, having a spring finger and a connecting arm connecting the spring finger and one side wall of the frame; and
at least one radiation element disposed between the spring finger and the light incident surface, the at least one radiation element having a side surface comprising a groove formed thereat;
wherein the spring finger of the at least one spring element comprises a contacting surface having a protrusion formed thereat, the protrusion corresponding to the groove of the at least one radiation element, and the contacting surface wholly adjoining the side surface of the at least one radiation element, and a width of the at least one radiation element is larger than a distance between the light incident surface and the spring finger in a free state.

7. The backlight module as claimed in claim 6, wherein the at least one spring element is a plurality of spring elements.

8. The backlight module as claimed in claim 7, wherein the side wall comprising the plurality of spring elements further comprises a plurality of partition arms, each two adjacent partition arms and one spring element therebetween defining a light source setting area.

9. The backlight module as claimed in claim 8, wherein the at least one radiation element is a plurality of radiation elements, which are respectively disposed in the plurality of light source setting areas, corresponding to the spring elements one to one.

10. The backlight module as claimed in claim 6, wherein the connecting arm is strip-shaped, having a predetermined thickness.

11. The backlight module as claimed in claim 6, wherein the spring finger is parallel to the side wall, and spaced a predetermined interval from the side wall.

12. The backlight module as claimed in claim 8, wherein the connecting arm of the spring element between two adjacent partition arms has a width of the same dimension as an interval between the two adjacent partition arms, and has a predetermined thickness.

13. A liquid crystal display device, comprising:
a liquid crystal display panel; and
a backlight module disposed adjacent to the liquid crystal display panel, comprising:
a frame having a plurality of side walls;
a light guide plate received in the frame, and having a light incident surface;
at least one spring element, having a spring finger and a connecting arm connecting the spring finger and one side wall of the frame; and
at least one radiation element disposed between the spring finger and the light incident surface;
wherein the spring finger is parallel to the side wall and spaced a predetermined interval from the side wall by the connecting arm, and a width of the at least one radiation element is larger than a distance between the light incident surface and the spring finger in a free state.

14. The liquid crystal display device as claimed in claim 13, wherein the at least one spring element is a plurality of spring elements.

15. The liquid crystal display device as claimed in claim 14, wherein the side wall comprising the plurality of spring elements further comprises a plurality of partition arms, each two adjacent partition arms and one spring element therebetween defining a light source setting area.

16. The liquid crystal display device as claimed in claim 15, wherein the at least one radiation element is a plurality of radiation elements, which are respectively disposed in the plurality of light source setting areas, corresponding to the spring elements one to one.

17. The liquid crystal display device as claimed in claim 13, wherein the at least one radiation element has a side surface comprising a groove formed thereat.

18. The liquid crystal display device as claimed in claim 17, wherein the spring finger of the at least one spring element comprises a contacting surface having a protrusion formed thereat, the protrusion corresponding to the groove of the at least one radiation element, and the contacting surface wholly adjoining the side surface of the at least one radiation element.

19. The liquid crystal display device as claimed in claim 13, wherein the connecting arm is strip-shaped, having a predetermined thickness.

* * * * *